United States Patent [19]

Taylor

[11] 4,397,024
[45] Aug. 2, 1983

[54] TECHNIQUE FOR AMPLIFYING TWO OR MORE LASER BEAMS IN A SINGLE LASER AMPLIFIER

[75] Inventor: Lyle H. Taylor, Murrysville, Pa.

[73] Assignee: Westinghouse Electric Corp., Pittsburgh, Pa.

[21] Appl. No.: 219,181

[22] Filed: Dec. 22, 1980

[51] Int. Cl.³ .............................................. H01S 3/093
[52] U.S. Cl. ....................................... 372/23; 372/89
[58] Field of Search ................... 372/23, 91, 89, 4, 58; 339/4.3

[56] References Cited

U.S. PATENT DOCUMENTS

| 4,004,250 | 1/1977 | Krupke | 372/91 |
| 4,053,851 | 10/1977 | Krupke | 372/4 |
| 4,053,852 | 10/1977 | Krupke | 372/4 |
| 4,056,789 | 11/1977 | Stregack et al. | 372/58 |
| 4,136,317 | 1/1979 | Stregack et al. | 372/4 |
| 4,168,474 | 9/1979 | Pleasance | 372/4 |

Primary Examiner—William L. Sikes
Assistant Examiner—Léon Scott, Jr.
Attorney, Agent, or Firm—M. P. Lynch

[57] ABSTRACT

Multiple input laser pulses, wherein each pulse serves to create the population inversion for the next pulse, are amplified in the laser medium of a single laser amplifier apparatus.

18 Claims, 6 Drawing Figures

TECHNIQUE FOR AMPLIFYING TWO OR MORE LASER BEAMS IN A SINGLE LASER AMPLIFIER

BACKGROUND OF THE INVENTION

It is frequently desirable to obtain high laser energies by amplifying a low energy laser oscillator. The laser oscillator design and construction are thereby simplified since the oscillator is not required to handle high energies.

The conventional design of the laser amplifier is to store energy in the amplifier medium such that a high population inversion is maintained for the lasing transition. The incident laser beam then dumps this population inversion and it is amplified as it traverses the amplifier.

However, a two-photon, three-level laser, such as the 16 μm $CO_2$ bending mode laser, lases at two wavelengths, 9.4 and 16 μm, where the lasing involves three vibrational levels, and where the lower laser level for the first lasing transition is the upper laser level for the second lasing transition. More specifically, the first lasing transition dumps energy from the upper laser level to an intermediate laser level. A population inversion is thereby created between the intermediate laser level and the lower laser level which results in the second lasing transition.

Since the population inversion for the second lasing transition results from the first lasing transition, and is quickly depleted by collisional relaxation processes, an amplifier for a two-photon, three-level laser oscillator cannot store energy by maintaining a high population inversion for the second lasing transition.

SUMMARY OF THE INVENTION

There is described herein with reference to accompanying drawings a relatively simple amplifier design capable of operating at high or low temperatures and/or pressures, irrespective of the operating conditions of the two-photon laser oscillator which is usually restricted to operation at low temperatures and pressures. Furthermore, the amplifier design is capable of amplifying both lasing transitions provided by the two-photon oscillator. In other words both beams of a two-photon, three-level laser oscillator are amplified in a single laser amplifier.

Two band operation of the amplifier is achieved by: (1) initiating the amplifier excitation source at the proper time relative to the initiation of the oscillator excitation source, (2) adjusting the relative timing of the two input lasing beams, (3) adjusting the pulse widths of the two beams, (4) adjusting the relative intensities of the two beams, (5) having the two beams transverse as much of the same gas laser medium volume in the amplifier as possible, and (6) using the appropriate gas mixture, pressure, and temperature.

The first requirement is simply achieved so as to optimize the desired amplifier performance. For example, if it is desirable to maximize the amplification of one of the two laser beams coming from a two-photon laser oscillator, the timing is adjusted so that the population inversion for that transition in the amplifier is a maximum when the incident laser beam at that wavelength arrives at the amplifier.

The second requirement is necessary because a two-photon, three-level oscillator will always produce a beam from the first laser transition i.e., between the upper and intermediate laser levels, prior to the beam from the second laser transition, i.e., between the intermediate and lower laser levels. However, the relative timing of the two beams will not, in general, be appropriate for the operation of the amplifier. In fact, the first laser beam will in most cases have to be delayed until it only slightly precedes the second laser beam.

The third and fourth requirements may not be necessary in all cases, but can be helpful in most cases. For example, if the pulse widths are too disparate for efficient amplifier operation, the long pulse can be shortened by an electro-optical device until the desired pulse width is obtained. Generally speaking, the two pulse widths should be nearly equal with the pulse width of the second beam never being appreciably longer than the pulse width of the first beam. This requirement is not applicable to CW laser operation.

The fourth requirement is helpful when the first or second laser beam intensity is so high that the last part of the beam is being absorbed rather than amplified. In this case, the beam which is too intense, may be attenuated or split so that only a part of it is fed into the amplifier. In any event, an ideal amplifier should only require one photon of the first laser beam for each photon of the second laser beam.

The fifth requirement is a result of the need to efficiently utilize the gain medium of the amplifier. Both beams should transverse the same volume because the population inversion needed for amplification of the second beam results from stimulated emission or absorption of the first beam.

The sixth, and final requirement, is recited because the gas pressure, mixture, and temperature values which optimize the performance of conventional laser amplifiers are generally different than the values at which the two band amplifier will operate.

BRIEF DESCRIPTION OF THE DRAWING

The invention will become more readily apparent from the following exemplary description in connection with the accompanying drawing.

DESCRIPTION OF THE PREFERRED EMBODIMENT

Figure 1:
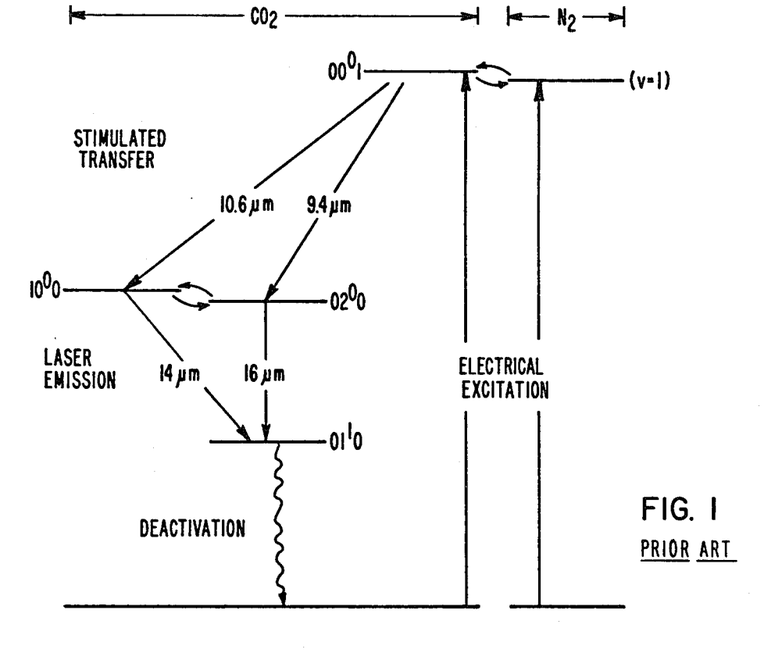
FIG. 1 is a vibrational energy level diagram showing the major interactions leading to 9.4 μm and 16 μm laser emissions from a $CO_2$ laser oscillator or apparatus.

While the novel techniques described above are applicable in general to the amplification of multiple input laser beams in a single laser amplifier, such as the two beams produced by a two-photon, three-level laser system, the technique will be typically described herein as applied to the 16 μm $CO_2$ bending mode laser system. The vibrational energy level diagram for this laser is illustrated in FIG. 1 with the three levels corresponding to an upper laser level of $00^01$, an intermediate level of $02^00$, and a lower level of $01^10$. The major interactions of the 16 μm $CO_2$ bending mode laser are also illustrated in FIG. 1. A detailed description of the operation of this laser is provided in U.S. Pat. No. 4,168,474 which is assigned to the assignee of the present invention and incorporated herein by reference.

Figure 2:
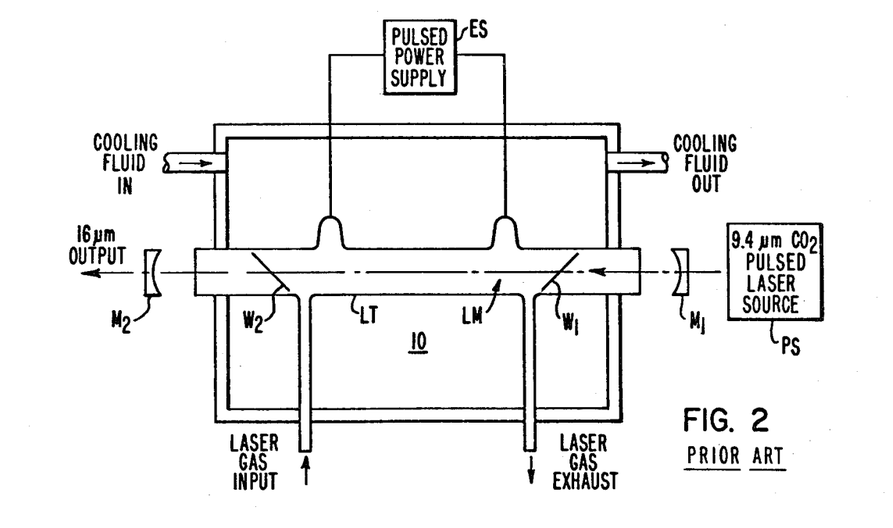
FIG. 2 is a schematic illustration of a 16 μm $CO_2$ laser oscillator.

A sectioned schematic illustration of a 16 $\mu$m $CO_2$ laser oscillator is shown in FIG. 2. The lasing medium, LM, consists of a gas composition including a lasing gas $CO_2$, an energizing gas $N_2$, and a buffer gas He. The gases are contained between the two laser windows $W_1$, $W_2$ and cooled by a cooling fluid which surrounds the laser tube LT. The laser medium is electrically excited by a discharge pulse from the electrical excitation source ES. As in a conventional 10.6 $\mu$m $CO_2$ laser, the $00^01$ level of $CO_2$ and the vibrational states of $N_2$ are preferentially pumped by the electrical discharge. After the discharge pulse, the excited $N_2$ transfers much of its excitation energy to the upper $CO_2$ laser level $00^01$, via vibrational-vibrational collisions, while the intermediate laser level, $02^00$, and the lower laser level, $01^10$, lose much of their excitation energy by vibrational-translational collisions with the He atoms in the laser gas mixture LM.

These energy transfers result in a long lived population inversion on the 9.4 $\mu$m laser transition, $00^01 \rightarrow 02^00$. The excess population of the $00^01$ level is then transferred to the intermediate $CO_2$ laser level, $02^00$, by stimulated emission caused by an externally delivered 9.4 $\mu$m laser pulse from pulse source PS. The latter pulse is delivered at an optimum time after the discharge pulse from the excitation source ES, i.e., when the potential population inversion for the 16 $\mu$m lasing is a maximum.

Figure 6:
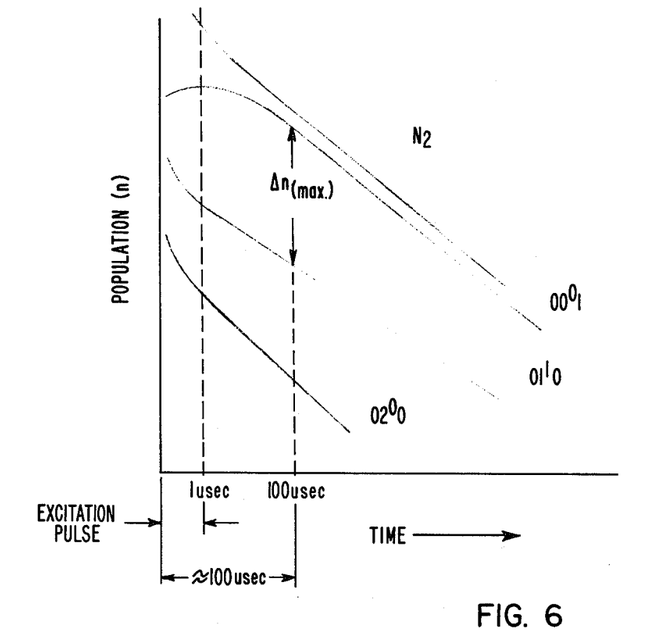

The optimum time corresponds to the condition reflected in FIG. 6 where the $\Delta n$, or population difference, between the $00^01$ and $01^10$ laser levels is maximum. This can be determined theoretically or experimentally. Typically, the actuation pulse from the source ES is 1$\mu$ sec. in duration and the maximum $\Delta n$ occurs about 100$\mu$ seconds later. The stimulated transfer resulting from the application of the 9.4 $\mu$m pump pulse of source PS at this optimum time generates a population inversion between the intermediate laser level and the lower laser level of FIG. 1 which results in laser emission at 16 $\mu$m. The buildup of the 16 $\mu$m laser radiation is controlled by the laser cavity mirrors $M_1$, $M_2$, and proceeds as in conventional laser oscillators.

Figure 3:
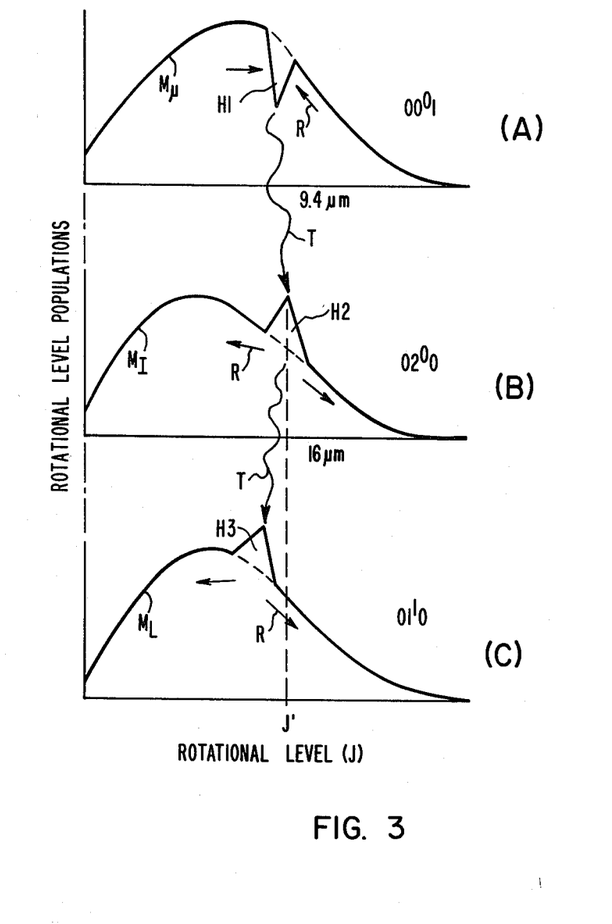
FIG. 3 is a graphical illustration of rotational relaxation in the 16 μm $CO_2$ bending mode laser.

The effects of rotational relaxation, i.e. rotational-rotational collisional energy exchanges, on the laser kinetics of oscillators and amplifiers are illustrated in FIG. 3. In this figure J is the rotational level quantum number, the wavy arrows T indicate the direction of population flow due to the lasing transitions, and the solid arrows R indicate the general direction of population flow due to rotational relaxation. The 9.4 $\mu$m lasing effectively "burns a hole" H1 in the rotational manifold $M_u$ of the upper laser level $00^01$, and produces an overpopulated rotational level H2 in the rotataional manifold $M_I$ of the intermediate laser level $02^00$. Rotational relaxation acts to fill in the "hole" H1 in the manifold $M_u$ while reducing the population of the overpopulated level H2 in the manifold $M_I$. This overpopulation in the manifold $M_I$ generates the population inversion necessary for the 16 $\mu$m lasing which in turn reduces the overpopulated rotational level in manifold $M_I$ while creating an overpopulation H3 of the rotational level in manifold $M_L$.

Rotational relaxation therefore acts to increase the underpopulated level in manifold $M_u$ of FIG. 3A, and to reduce the overpopulated levels in manifolds $M_I$ and $M_L$ of FIGS. 3B and 3C respectively. The effects in manifolds $M_u$ and $M_L$ act to increase the laser performance whereas the effect in manifold $M_I$ is to reduce the laser performance of the 16 $\mu$m transition. These experimentally verified effects of rotational relaxation on the performance of two-photon, three-level laser systems form the basis for the novel techniques described herein.

Figure 5:
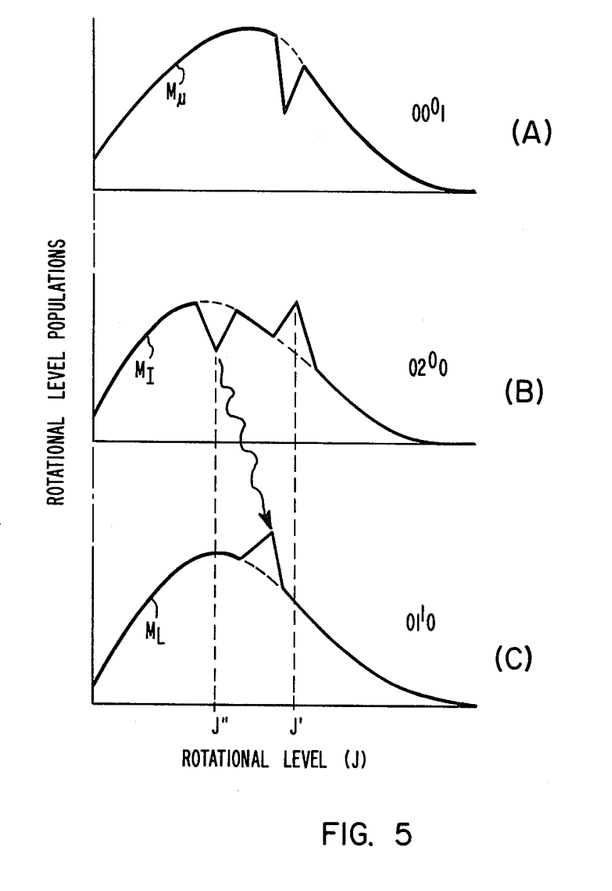
FIGS. 5 and 6 are further graphical illustrations of the operation of the invention.

Before proceeding, it is important to note that another method of operating the 16 $\mu$m $CO_2$ bending mode laser is to allow the 9.4 $\mu$m lasing transition to terminate on rotation level J' in the manifold $M_I$ and to have the 16 $\mu$m lasing transition originate from the rotational level J'' in manifold $M_I$ where J'$\neq$J''. This operating mode is illustrated in FIG. 5. In this case, enough rotational relaxation within the manifold $M_I$ must occur to create the short-lived population inversion needed for the 16 $\mu$m lasing—but without allowing too much vibrational relaxation of the $02^00$ level which would destroy the population inversion. However, the first method of operation (J'=J'') is the more common method and is assumed for the description of the preferred embodiment.

Figure 4:
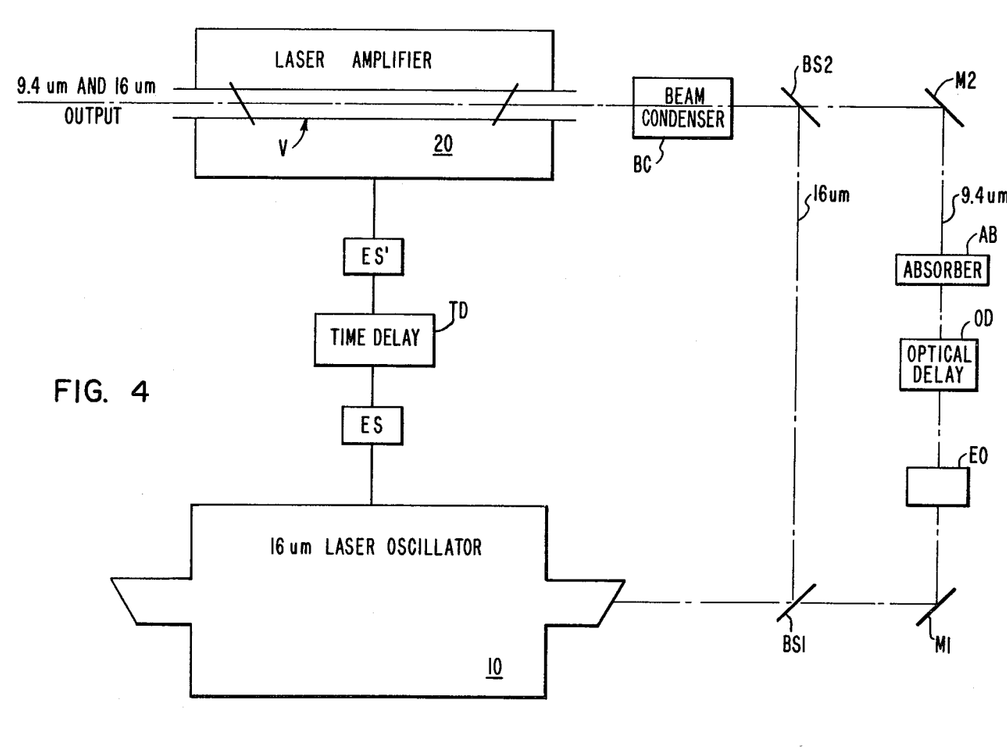
FIG. 4 is a block diagram illustration of an embodiment of the invention.

From this understanding of the operation of a two-photon, three-level laser, the technique for operating an amplifier to amplify both input laser beams can be appreciated. One possible configuration is shown in FIG. 4 where the two beams coming from a 16 $\mu$m $CO_2$ laser oscillator, as shown in FIG. 2, are split by a beam splitter BS1, travel different optical paths, and are recombined by the second beam splitter BS2. The combined beams are then focused by a beam condenser BC to match the laser medium volume in the laser amplifier. The amplifier increases the laser intensity of both the 9.4 $\mu$m and the 16 $\mu$m laser beams.

The 9.4 $\mu$m beam, the first beam, which is usually more intense than the 16 $\mu$m beam, the second beam, is isolated by the first beam splitter BS1, reflected by the first mirror M1, into an optical delay OD, through an absorber AB, and is reflected by a second mirror M2, such that it can be recombined with the 16 $\mu$m beam via the second beam splitter BS2.

The first technique to achieve amplification of both beams is to initiate the amplifier excitation source ES' at the proper time relative to the initiation of the oscillator excitation source ES as illustrated in FIG. 6. FIG. 6 illustrates vibrational level populations as a function of time without lasing. The time delay circuit TD delays the activation of excitation source ES' for a predetermined time following the activation of the excitation source ES. This timing is necessary because the optimum time between excitation and lasing for the oscillator 10 and amplifier 20 is usually different, and to further account for the travel time of the beams from the oscillator 10 to the amplifier 20.

The activation of the excitation source ES' is controlled by the delay circuit TD to correspond to the time when the population inversion, $\Delta n$ of FIG. 6, is about maximum for one of the two laser input beams, or pulses. In the case of input laser beams of 9.4 $\mu$m and 16 $\mu$m the maximum $\Delta n$ is essentially coincidental. In the event the maximum $\Delta n$ for two or more input laser beams is different than the activation of the excitation source ES' would be controlled to occur at one of the maximum $\Delta n$ conditions or at a predetermined point relative to the several $\Delta n$ maximum of the respective input laser beams, or pulses.

Since the population inversion needed for the amplification of the 16 $\mu$m beam is formed by the 9.4 $\mu$m beam and rapidly lost by rotational relaxation (or by vibrational relaxation), the 16 μm pulse must be present in the amplifier 20 while the inversion is there and before it disappears. This feature of the amplifier 20 operation dictates that the 16 μm pulse cannot precede the 9.4 μm pulse and cannot significantly trail the 9.4 μm pulse. In other words, the leading edges of the pulses of the two laser beams as inputs to the amplifier 20 should be nearly coincident in time and space. This near-coincidence is achieved by the optical delay OD in the 9.4 μm optical path, and the beam condenser BC. The beam condenser BC is commercially available from commercial suppliers such as Perkin Elmer. The optical delay OD can be implemented by using spaced apart mirrors. The optical absorber AB can be implemented with commercial devices or simply through the use of a material such as saran wrap.

Furthermore, the 9.4 μm pulse cannot be so short that the population inversion needed for the amplification of the 16 μm beam is lost before the end of the 16 μm pulse transverses the amplifier 20. The proper 9.4 μm pulse length can be achieved by using an external source of the 9.4 μm radiation which can be more easily controlled or by using a conventional optical shutter device EO in the 9.4 μm beam path as shown in FIG. 4. On the other hand, once the lower laser level has reached a certain value of population, the 9.4 μm radiation cannot produce any population inversion for 16 μm amplification. In fact, any further 16 μm radiation will be absorbed and will actually reduce the amplification of the remaining 9.4 μm radiation. In order to avoid this condition the 16 μm pulse may be shortened by a conventional optical shutter device EO. Furthermore, the two beam paths, or input pulses, are optically adjusted in FIG. 4 so they transverse as much of the same laser medium volume V in the amplifier 20 as possible since both beams must be present in the same spatial volume. The first beam, or input pulse, functions to create the population inversion for the second beam or input pulse.

Since, under ideal conditions, it takes only one 9.4 μm photon to provide the necessary conditions to amplify one 16 μm photon, any excess 9.4 μm photons are wasted as far as amplifying the 16 μm radiation. Furthermore, if too many 9.4 μm photons are used, the entire $02^00$ level will be so heavily populated that the vibrational-translational collisions will quickly transfer much of the $02^00$ level population to the $01^10$ level, thereby destroying the population inversion needed for the amplification of the 16 μm beam. The absorber AB in FIG. 4 reduces the 9.4 μm beam intensity to achieve a condition whereby the intensity of the 16 μm beam is sufficient to realize the goal of one 16 μm photon to one 9.4 μm photon goal and yet is less than that which would significantly reduce the amplification of the 16 μm beam. This corresponds typically to a 9.4 μm beam intensity which is approximately 170% of the intensity of the 16 μm beam.

The lifetime and magnitude of the population inversion needed for amplification of the 16 μm input beam in amplifier 20 is a function, in part, of the gas mixture, pressure, and temperature. These gas properties are be selected to optimize the two-photon amplifier performance. The ratios of the laser gas constituents, i.e. $CO_2$, $N_2$, He, will in general be slightly different than those typically used in two-photon, three-level laser oscillators as described in the above-referenced U.S. Patent. However, there is a significant difference in the amplifier operation compared to a conventional 10.6 μm $CO_2$ amplifier since the He content of the gas must be sufficient to maintain the low bending mode population in the intermediate and lower laser levels. Thus, while the He content of a conventional 10.6 μm laser gas medium is typically about 50%, in this amplifier embodiment the He content is about 90%. This corresponds to a $CO_2$:$N_2$:He laser gas composition of about 1:2:25. Furthermore, the low pressures, i.e., about 50 Torr, and low temperatures, i.e., about 160° K., needed for laser operation of the 16 μm $CO_2$ bending mode laser oscillator will typically be needed for good laser operation of the amplifier.

These teachings of the disclosed invention for amplifying both laser beams of a two-photon, three-phase laser oscillator have been applied to a pulsed, infrared laser. Experimental verification of the inventive concepts were conducted at a pressure of 8.25 Torr and a temperature of 157° K. However, other lasers such as electronic lasers, e.g. KrF, HgBr, etc., are also considered to be a part of the teaching of this application. Furthermore, the requirements for amplifier performance which deal with the relative beam intensities, the transversing of the same amplifier volume by the two beams, and the proper selection of gas mixture, pressure, and temperature, are applicable to continuous wave, CW, operation and are considered to be a part of the teaching of this application. Finally, the extension to non-gaseous laser media; three-photon, four-level lasers, etc.; and to laser systems in which the two laser beams originate in different sources, rather than from a single laser oscillator, is considered to be a part of the teachings of this application.

What we claim is:

1. A method for amplifying two or more laser input pulses, said laser input pulses consisting of at least a first and second laser input pulse, in a single laser amplifier system comprising an active laser medium, spaced apart optics defining the path of said input pulses through said active laser medium, active laser medium excitation means operatively associated with said active laser medium to create the population inversion for said first laser input pulse, said first laser input pulse creating the population inversion in said active laser medium for said second laser input pulse, comprising the steps of, controlling the entry of said first and second laser input pulses into said active laser medium of said laser amplifier system such that said first laser input pulse precedes said second laser input pulse by a time which is greater than the time required for rotational relaxation in order to permit the generation of the population inversion in said active laser medium for said second laser input pulse but less than the time required for loss of said population inversion due to vibrational relaxation, exciting the active laser medium of said laser amplifier system at a time when the population inversion in said active laser medium is about maximum for at least one of the laser transitions of said laser input pulses, and adjusting the relative intensities of the first and second laser input pulses to avoid absorption of the final portion of said pulses thereby providing amplification of essentially the total first and second input pulses.

2. A method as claimed in claim 1 further including the step of adjusting the pulse widths of said first and second laser input pulses to make the width of said pulses approximately equal.

3. A method as claimed in claim 1 further including the step of optically directing the entry of said first and second laser input pulses into said laser amplifier system to assure that said first and second laser input pulses traverse the same volume of said active laser medium.

4. A method as claimed in claim 1 further including the step of controlling the beam intensity of said first laser input pulse to produce the condition whereby one photon of said first laser input pulse amplifies one photon of said second laser input pulse.

5. Apparatus for amplifying two or more laser input pulses, said laser input pulses consisting of at least a first and second laser input pulse, in a single laser amplifier system comprising an active laser medium, spaced apart optics defining the path of said input pulses through said active laser medium, active laser medium excitation means operatively associated with said active laser medium to create the population inversion for said first laser input pulse, said first laser input pulse creating the population inversion in said active laser medium for said second laser input pulse, comprising:

means for producing said first and second laser input pulses, means for controlling the entry of said first and second laser input pulses into active laser medium of said laser amplifier system such that said first laser input pulse precedes said second laser input pulse by a time which is greater than the time required for rotational relaxation in order to permit the generation of the population inversion in said active laser medium for said second laser input pulse but less than the time required for loss of said population inversion due to vibration relaxation, means for exciting the active laser medium of said laser amplifier system at a time when the population inversion in said active laser medium is about maximum for at least one of the laser transitions of said laser input pulses, and means for adjusting the relative intensities of the first and second laser input pulses to avoid absorption of the final portion of said pulses thereby providing amplification of essentially the total first and second laser input pulses.

6. Apparatus as claimed in claim 5 further including means for adjusting the pulse widths of said first and second laser input pulses to make the width of said pulses approximately equal.

7. Apparatus as claimed in claim 5 further including means for directing the entry of said first and second laser input pulses into said laser amplifier system to assure that said first and second laser input pulses traverse the same volume of said active laser medium.

8. Apparatus as claimed in claim 5 further including means for controlling the beam intensity of said first laser input pulse to produce the condition whereby one photon of said first laser input pulse amplifies one photon of said second laser input pulse.

9. Apparatus as claimed in claim 5 wherein said first laser input pulse is 9.4 $\mu$m and said second laser input pulse is 16 $\mu$m, and said active laser medium is a gas consisting of $CO_2$, $N_2$ and He in a mixture of about 1:2:25.

10. A method for amplifying two or more laser input pulses, said laser input pulses consisting of at least a first and second laser input pulse, in a single laser amplifier system comprising an active laser medium, spaced apart optics defining the path of said input pulses through said active laser medium, laser excitation means operatively associated with said active laser medium to create the population inversion for said first laser input pulse, said first laser input pulse creating the population inversion for said second laser input pulse, comprising the steps of, controlling the entry of said first and second laser input pulses into said active laser medium of said laser amplifier system such that said first laser input pulse precedes said second laser input pulse by a time sufficient to permit the generation of the population inversion in said active laser medium for said second laser input pulse, said time being less than the time required for loss of said population inversion by vibrational and rotational relaxation, exciting the active laser medium of said laser amplifier system at a time when the population inversion in said laser medium is about maximum for at least one of the laser transitions of said laser input pulses, and adjusting the relative intensities of the first and second laser input pulses to avoid absorption of the final portion of said pulses thereby providing amplification of essentially the total first and second laser input pulses.

11. A method as claimed in claim 10 further including the steps of adjusting the pulse widths of said first and second laser input pulses to make the width of said pulses approximately equal.

12. A method as claimed in claim 10 further including the step of optically directing the entry of said first and second laser input pulses into said laser amplifier system to ensure that said first and second laser input pulses traverse the same volume of said active laser medium.

13. A method as claimed in claim 10 further including the step of controlling the beam intensity of said first laser input pulse to produce the condition whereby one photon of said first laser input pulse amplifies one photon of said second laser input pulse.

14. Apparatus for amplifying two or more laser input pulses, said laser input pulses consisting of at least a first and second laser input pulse, in a single laser amplifier system comprising an active laser medium, spaced apart optics defining the path of said input pulses through said active laser medium, laser excitation means operatively associated with said active laser medium, laser excitation means operatively associated with said active laser medium to create the population inversion for said first laser input pulse, said first laser input pulse creating the population inversion for said second laser input pulse, comprising, means for controlling the entry of said first and second laser input pulses into said active laser medium of said laser amplifier system such that said first laser input pulse precedes said second laser input pulse by a time sufficient to permit the generation of the population inversion in said active laser medium for said second laser input pulse, said time being less than the time required for loss of said population inversion by vibrational and rotational relaxation, means for exciting the active laser medium of said laser amplifier system at a time when the population inversion in said laser medium is about maximum for at least one of the laser transitions of said laser input pulses, and means for adjusting the relative intensities of the first and second laser input pulses to avoid absorption of the final portion of said pulses thereby providing amplification of essentially the total first and second laser input pulses.

15. Apparatus as claimed in claim 14 further including means for adjusting the pulse widths of said first and second laser input pulses to make the width of said pulses approximately equal.

16. Apparatus as claimed in claim 14 further including means for directing the entry of said first and second laser input pulses into said laser amplifier system to ensure that said first and second laser input pulses traverse the same volume of said active laser medium.

17. Apparatus as claimed in claim 14 further including means for controlling the beam intensity of said first laser input pulse to produce the condition whereby one photon of said first laser input pulse amplifies one photon of said second laser input pulse.

18. Apparatus as claimed in claim 14 wherein said first laser input pulse is 9.4 $\mu$m and said second laser input pulse is 16 $\mu$m, and said active laser medium is a gas consisting of $CO_2$, $N_2$ and He in a mixture of about 1:2:25.

* * * * *